United States Patent [19]
Ashall

[11] Patent Number: 5,625,968
[45] Date of Patent: May 6, 1997

[54] DISPLAY SYSTEM

[75] Inventor: John Ashall, Runaway Bay, Australia

[73] Assignee: Illumination Research Group, Inc., Greensboro, N.C.

[21] Appl. No.: 378,790

[22] Filed: Jan. 26, 1995

Related U.S. Application Data

[63] Continuation of Ser. No. 30,416, filed as PCT/AU91/00436 Sep. 20, 1991 published as WO92/05535 Apr. 2, 1992, Pat. No. 5,390,436.

[30] Foreign Application Priority Data

Sep. 20, 1990 [AU] Australia ................. PK2392

[51] Int. Cl.$^6$ .................................. G09F 13/18
[52] U.S. Cl. .............................. 40/546; 362/31
[58] Field of Search ................. 40/542, 543, 546, 40/572, 582, 547; 362/31

[56] References Cited

U.S. PATENT DOCUMENTS

| | | | |
|---|---|---|---|
| 2,994,149 | 8/1961 | Endelson | 40/546 |
| 3,241,256 | 3/1966 | Viret et al. | 40/546 |
| 3,486,261 | 12/1969 | Hardesty | 40/546 |
| 3,510,976 | 5/1970 | Pauline et al. | 40/542 X |
| 3,591,941 | 7/1971 | Jaffe, Jr. | 40/546 |
| 4,385,343 | 5/1983 | Plumly | 40/546 X |
| 4,386,476 | 6/1983 | Schulman | 40/546 |
| 4,715,137 | 12/1987 | Scheve | 40/546 |
| 4,791,745 | 12/1988 | Pohn | 40/543 X |
| 4,965,950 | 10/1990 | Yamada | 40/546 |
| 4,974,354 | 12/1990 | Hembrook, Jr. | |
| 4,975,809 | 12/1990 | Ku | |
| 5,043,716 | 8/1991 | Latz et al. | 40/547 X |
| 5,283,968 | 2/1994 | Williams | |

FOREIGN PATENT DOCUMENTS

| | | | |
|---|---|---|---|
| A49428/85 | 11/1985 | Australia | |
| B20642/88 | 1/1991 | Australia | |
| 3706392 | 9/1988 | Germany | 40/582 |
| A2/157791 | 6/1990 | Japan | |
| 2-157791 | 6/1990 | Japan | |
| A2-269382 | 11/1990 | Japan | |
| 2-269382 | 11/1990 | Japan | |
| 206773 | 1/1987 | New Zealand | |

*Primary Examiner*—Joanne Silbermann
*Attorney, Agent, or Firm*—Kinney & Lange, P.A.

[57] ABSTRACT

An edgelit illuminated display system has a transparent medium having first and second opposing surfaces and at least one edge operable with a light source for illuminating the first and second surfaces. A matrix of dots on each of the surfaces is arranged to allow interaction of light between the surfaces. The matrix of dots on at least one of the surfaces substantially covers the entire surface for providing an even increased illumination throughout the surface, wherein when a graphic image is supported over the surface the graphic image is evenly illuminated.

2 Claims, 2 Drawing Sheets

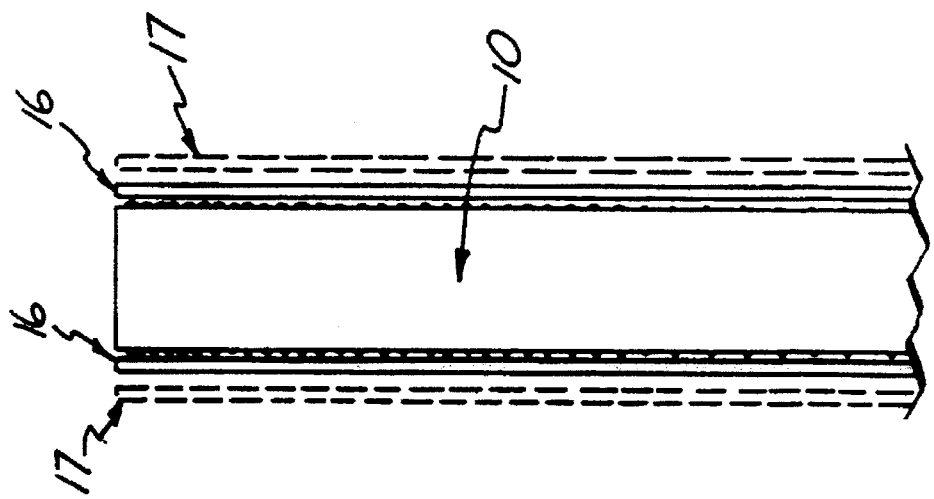
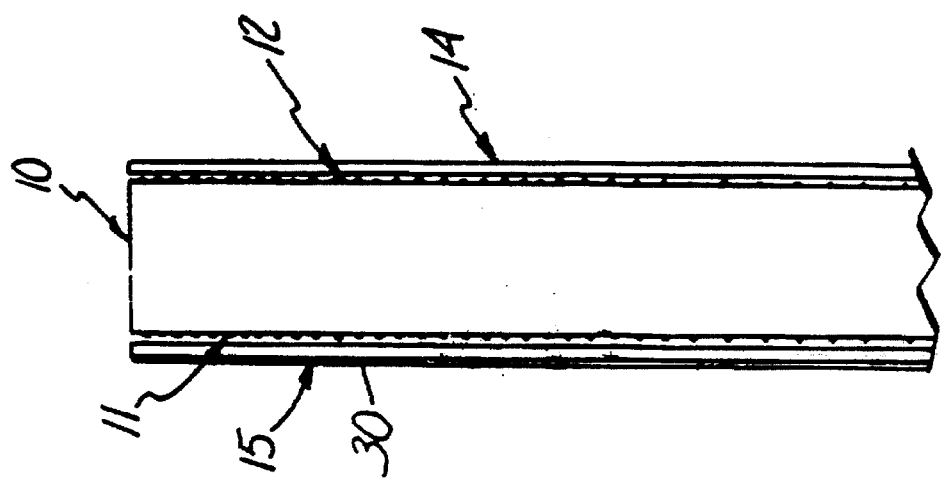

DISPLAY SYSTEM

This is a continuation of application Ser. No. 08/030,416, filed as PCT/AU91/00436 Sep. 20, 1991 published as WO92/05535 Apr. 2, 1992, now U.S. Pat. No. 5,390,436.

The invention relates to a novel display system, and to in particular illuminated display boards.

Originally, illuminated display boards were essentially display boards with an external light source. For example, a billboard with lights. Smaller displays were generally even less sophisticated and were not even illuminated.

As the market grew and the need for advertising increased so has the need for more sophisticated but just as simple display systems.

With the advent of translucent plastics, back-illuminated signs and displays have become very popular. This type of system essentially comprises a bank of lights, generally the fluorescent variety with a translucent sheet with the sign applied thereto; either by the way of painting or etching and the like. Large banks of lights are often required to illuminate the entire surface of the signs. A disadvantage of such back-illuminated signs is that a large number of lights are required, increasing running costs and maintenance costs since they are continually needing to be replaced. Furthermore, when one light needs to be replaced generally the entire sign needs to be dismantled, which is a great inconvenience when a large sign is involved.

Clear sheet materials with the sign directly applied to the surface have recently been used. However, the problem with these types of signs/displays, as with the back-illuminated signs, a number of lights are required to fully illuminate the sign. In this case the display requires a light source along each edge of the sheet in order for the sign to be illuminated and even then the middle portion of the display is not illuminated to the same degree as the edges.

The prior art has attempted to increase the degree of illumination of translucent and transparent mediums and generally these attempts have not been particularly successful when applied to larger areas which is often the case with signs. Illumination of a small area is generally easier and an attempt at increasing the illumination of a small area is discussed in U.S. Pat. No. 3,241,256. This patent dealt with providing uniform brightness on instrument dials, scales and indicator tapes, generally small in nature. A dot pattern was applied to the rear side of the light transmitting block only wherein the block is supported by a plate. As with previous systems, when larger areas are required to be illuminated, a number of light sources are required to fully illuminate the entire area of the sign.

SUMMARY OF THE INVENTION

The present invention provides a novel illuminated display system which reduces the number of lights required to illuminate the same size display and also alleviate some of the other problems of the prior art.

The invention provides an illuminated display system comprising at least one transparent sheet having two opposing surfaces, wherein at least one of said surfaces has a matrix of dots substantially covering said surface. Most preferably, each of said surfaces has a matrix of dots substantially covering said surface.

The invention also provides an article for use in an illuminated display system comprising a transparent sheet having two opposing surfaces, wherein at least one of said surfaces has a matrix of dots substantially covering said surface. Most preferably, each of said surfaces has a matrix of dots substantially covering said surface. The invention further provides an article for fixing on to a transparent sheet used in an illuminated display system comprising a transparent film with a matrix of dots applied thereto.

Surprisingly and advantageously, the illuminated display system of the present invention with a dot matrix applied to both sides of the transparent sheet, provides greater and more even illumination of the sign. This is also true for large signs. The prior art does not discuss this important finding and the theory does not predict that by applying a dot matrix to both sides would enhance illumination significantly. Also by using the system, maintenance is reduced as well as the power requirements.

The light source is generally fixed to only one edge of the transparent sheet. Only in very large signs may another light source be required on another edge.

Furthermore, the density of dots preferably increases along the transparent sheet in the direction from the edge where the light source is to be fixed.

To increase the density of dots the dots can either increase in number and the gaps between the dots decreases in size or alternatively, the gaps between the dots stay the same and the size of the dots increases.

"Dots" used in the specification and in the claims can be of any shape, for example square, round, rectangular, triangular and in fact can be of irregular shape. The dots are translucent or opaque and more preferably light-coloured for example, white.

The dots can be applied to the transparent sheet by etching, painting, screen printing or any other means of applying a medium to a transparent sheet. Alternatively, the matrix of dots may be applied to a transparent film which then may be adhered to the transparent sheet.

The transparent sheet may be glass or plastic but is preferably acrylic.

Generally to form the sign, in the case of a one-sided sign, a backing plate is provided which is generally opaque and light in colour, preferably white.

In the case of a two-sided sign, another sheet with a light coloured face, preferably white, facing the dot matrix of the transparent sheet, is attached. This other sheet may be plain or have the sign applied to the other side. This other sheet should be sufficiently translucent to allow some light to pass through and illuminate the sign. The other sheet may be made of any material including plastics and paper.

The light source can be retained in a carrier which can also act as a support for the transparent sheet. Preferably the light source is a fluorescent tube or depending on the size of the display, a number of tubes.

BRIEF DESCRIPTION OF THE DRAWINGS

FIG. 2a illustrates a preferred embodiment of a one-sided sign.

FIG. 2b illustrates a preferred embodiment of a two-sided sign.

Figure 1:
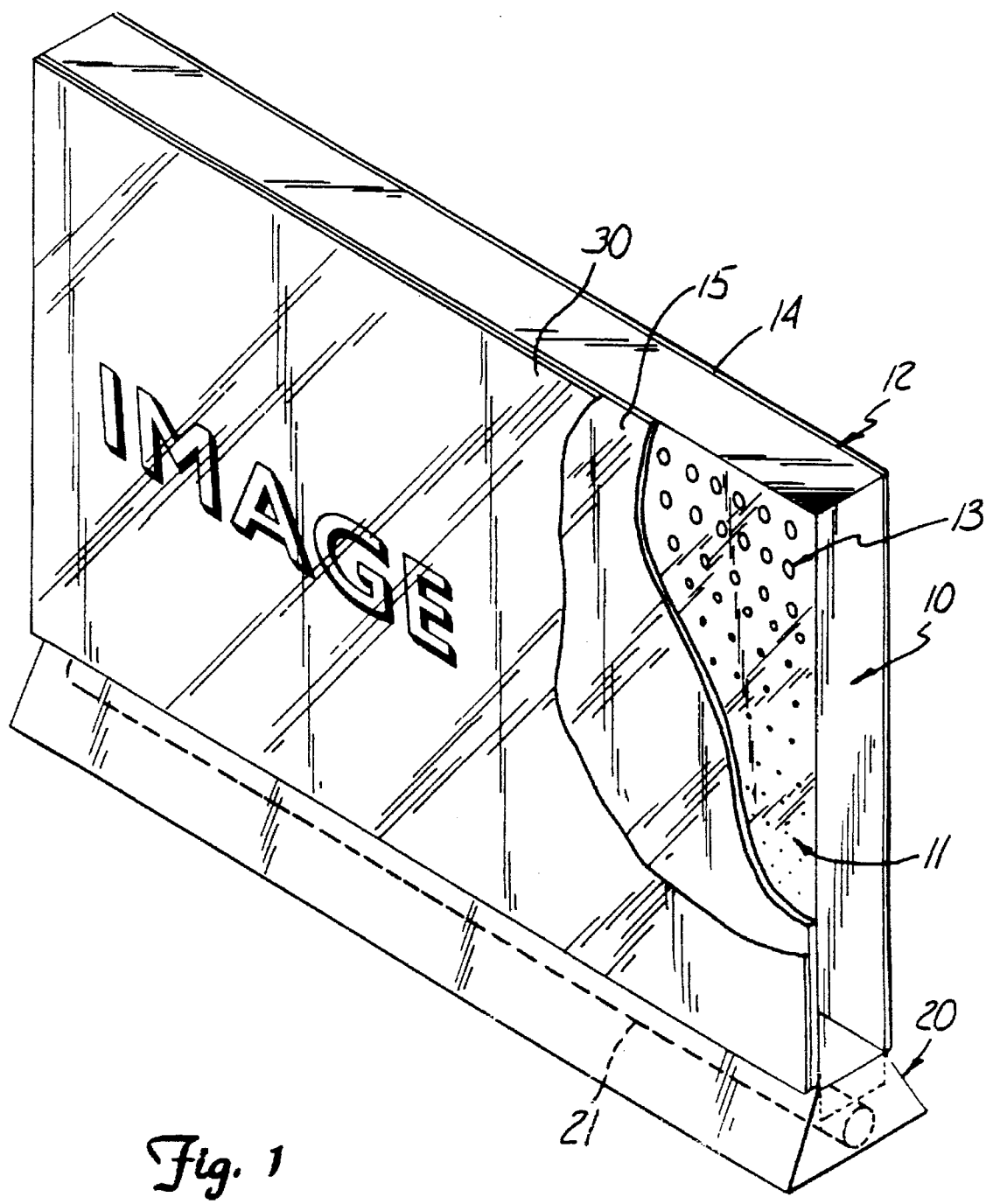
FIG. 1 illustrates a preferred embodiment of an illuminated display system of the present invention.

Item 10 illustrates a transparent sheet 10 with the matrix of dots 13 applied to the surface 11. A matrix of dots 13 is also applied to the other side 12.

DETAILED DESCRIPTION OF THE PREFERRED EMBODIMENTS

The transparent sheet 10 can be accommodated in a carrier 20 which also houses a light source 21. It should be noted that the light source can be affixed in alternate ways, providing the light source is substantially on the edge of the transparent medium 10.

FIGS. 1 and 2a illustrates an arrangement for a one-sided sign in accordance with the invention. Transparent sheet 10 with dot matrix 13 applied to both sides 11 and 12. A backing sheet 14 which is opaque and preferably white in colour is fixed to the transparent medium 10. FIG. 2a illustrates that there is a gap between each of the layers for clarity only, in practice the layers would be in substantial contact with each other. Sheet 15 has a sign 30 printed on its front side. The side in substantial contact with transparent sheet 10 is light in colour and generally white. Sheet 15 is sufficiently translucent to allow some light to pass through the sheet and illuminate the sign. Materials found to be sufficiently translucent include paper (for example posters) and plastic materials.

FIG. 2b illustrates an arrangement for a two-sided sign in accordance with the invention. In the case of a two-sided sign, sufficiently translucent sheets 16 are fixed to the transparent sheet 10 with dot matrix thereon. These sheets 16 may be plain or have the sign applied to the outer face of the sheet. The face contacting the transparent sheet 10, at least, is light coloured and preferably white. Similarly if the sheet 16 is plain, the sheet is preferably light coloured and more preferably white. In the case where sheets 16 are plain, further sheets 17 may be incorporated into the sign system, wherein the sheets 17 have the sign applied thereto. Once again sheets 17 are sufficiently translucent to allow some of the light to pass through and illuminate the sign. Similarly for the one-sided sign sheet 15 may be plain and an additional translucent sheet (not shown) can be fixed in front of the plain sheet 15.

Framework (not shown) or the like, can be used to secure all of the layers together. Similarly the carrier and light source housing 20 can also retain the translucent sign sheet.

To more clearly illustrate the present invention tests were conducted on different sized signs wherein the dot matrix in the first instance is only applied to one side of the transparent medium. The dot matrix in this preferred embodiment is applied by screen printing white dots directly on to the transparent material, in this case perspex. The density of the dot matrix, as indicated previously, increases away from the light source.

Secondly, the dot matrix is applied to both sides of the transparent medium in the same way as for the one-sided application.

In both cases only one edge of the sign had a lighting means attached thereto and fluorescent lighting was used. Furthermore, only one-sided signs were formed, and thus an opaque white backing sheet was used in the trials.

Light meter readings were taken at two positions on each of the signs, midway from the light source and at the opposite end of the light source.

The results of the tests are shown below:

TABLE 1

| Size of Sign (cm × cm) | | Light Meter Reading (Lux) | | (cm) |
| --- | --- | --- | --- | --- |
| | | Midway from light source | At Opposite end of light source | Distance from light source light travelled |
| 30 × 16 | one-sided | 3400 | 2400 | 16 |
| | two-sided | 2600 | 2400 | |
| 30 × 30 | one-sided | 1500 | 1250 | 30 |
| | two-sided | 1950 | 1450 | |
| 60 × 45 | one-sided | 475 | 435 | 45 |
| | two-sided | 810 | 685 | |
| 60 × 60 | one-sided | 440 | 300 | 60 |
| | two-sided | 720 | 440 | |

The test results clearly indicate a marked improvement of the illumination of the sign when the dot matrix is applied to both sides of the transparent medium. This is especially true in the middle of the sign wherein most of the message to be illuminated is placed. Furthermore the effectiveness of the dot matrix is still good even for larger sizes.

The display system in accordance with the invention can be used in small and very large displays and advantageously providing good illumination without the large number of lights previously required. Manufacturing and maintenance of the signs is less time consuming and simpler.

The claims defining the invention are as follows:

1. An edgelit luminaire comprising: a housing having an opening, a display panel having an upper edge and at least one surface carrying a layer having sections of differing transparency forming a graphic symbol, a source of illumination arranged in the housing and located substantially adjacent to the upper edge of said display panel, said display panel attached to the housing such that the panel extends from the opening in the housing and an array of dots on substantially the entire said one surface including said layer of differing transparency, said array of dots having a luminous quality affected by said source of illumination to spread light throughout the entire surface of said display panel thereby greatly enhancing illumination of said graphic symbol.

2. An edgelit luminaire comprising: a housing having an opening, a display panel having an upper edge; a source of illumination arranged adjacent to the upper edge of said display panel; and a graphic symbol, said display panel attached to the housing such that the panel extends from the opening therein, the display panel consists of two sheets of transparent material of substantially identical dimensions, each of said sheets carries an array of luminous dots on one surface and at least one of said sheets carries said graphic symbol, said array of luminous dots being on substantially the entire panel surface including the graphic symbol for ensuring an even distribution of light throughout the entire surface of the panel.

* * * * *